(12) United States Patent
Yamagata

(10) Patent No.: US 6,259,485 B1
(45) Date of Patent: Jul. 10, 2001

(54) SYNC SEPARATING CIRCUIT

(75) Inventor: Hiroshi Yamagata, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/153,353

(22) Filed: Sep. 15, 1998

(30) Foreign Application Priority Data

Sep. 17, 1997 (JP) .................................................. 9-252005

(51) Int. Cl.$^7$ .................................................. H04N 5/08
(52) U.S. Cl. .......................... 348/525; 348/521; 348/529; 348/531; 348/500
(58) Field of Search .................................. 348/525, 521, 348/540, 524, 529, 530, 531, 533, 500, 682, 532; 358/153, 154, 155, 156, 157; H04N 5/08

(56) References Cited

U.S. PATENT DOCUMENTS

| 4,185,299 | * | 1/1980 | Harford | 385/153 |
|---|---|---|---|---|
| 4,357,629 | * | 11/1982 | McGinn | 348/532 |
| 4,385,319 | * | 5/1983 | Hasegawa | 348/532 |
| 4,580,166 | * | 4/1986 | Okano | 348/531 |
| 4,616,270 | * | 10/1986 | Nishimoto | 348/531 |
| 4,691,248 | * | 9/1987 | Nishimoto | 348/531 |
| 4,707,740 | * | 11/1987 | Stratton | 348/532 |
| 4,723,165 | * | 2/1988 | Bart | 348/532 |
| 5,486,867 | | 1/1996 | Hsu et al. | 348/516 |
| 5,528,303 | * | 6/1996 | Bee et al. | 348/531 |
| 5,596,372 | | 1/1997 | Berman et al. | 348/537 |
| 5,754,250 | * | 5/1998 | Cooper | 348/525 |
| 5,818,538 | * | 10/1998 | Kim | 348/525 |
| 5,953,069 | * | 9/1999 | Bruins et al. | 348/525 |

FOREIGN PATENT DOCUMENTS

| 4127120 | 2/1993 | (DE) . | |
| 6-253170 | 9/1994 | (JP) | 5/8 |

* cited by examiner

Primary Examiner—Reinhard J. Eisenzopf
Assistant Examiner—Jean W. Désir
(74) Attorney, Agent, or Firm—Ronald P. Kananen; Rader, Fishman & Grauer

(57) ABSTRACT

A level is preset into a counter. The level held in the counter is compared with the minimum value of the present video signal by a level detecting circuit. When the minimum value of the present video signal is lower than the level of the counter, the intermediate value between the value of the counter so far and the minimum value of the present video signal is obtained by an intermediate value calculating circuit, thereby presetting the counter and updating the level. Thus, the value of the counter gradually approaches a sync chip level. The video signal is sliced by a slice level formed on the basis of the value of the counter by a slice circuit, thereby extracting the sync signal. Further, in a mask signal generating circuit, the updating of the level is inhibited for a predetermined time after the updating of the level was performed for a predetermined period of time, thereby preventing the level from being influenced by the noise for the video period. The counter is increased and the level is increased at a predetermined rate, thereby preventing the level from being influenced by a sag.

4 Claims, 3 Drawing Sheets

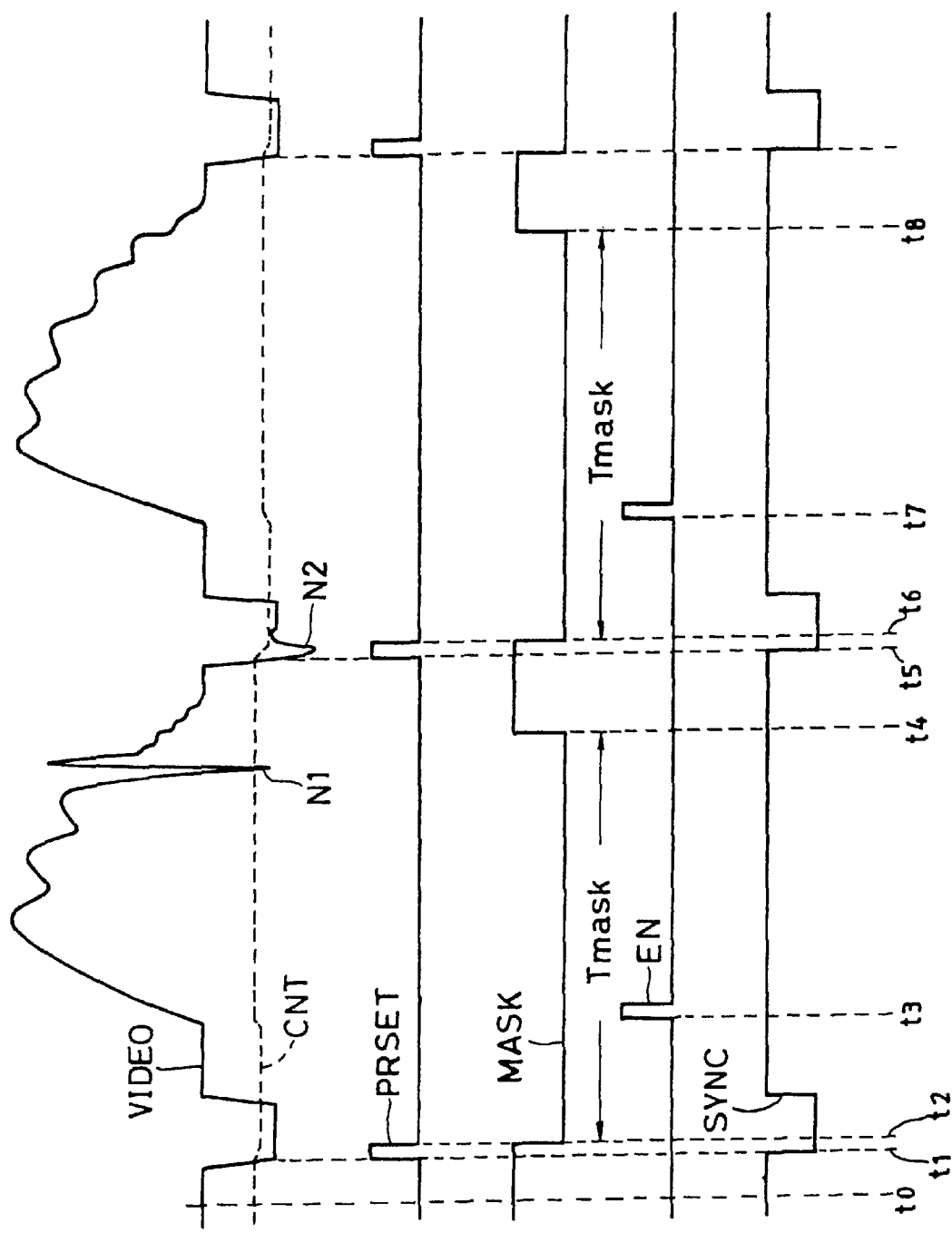

SYNC SEPARATING CIRCUIT

BACKGROUND OF THE INVENTION

1. Field of the Invention

The invention relates to a sync separating circuit for extracting a sync signal of a video signal and, more particularly, to a sync separating circuit to extract a sync signal from a digital video signal.

2. Description of the Related Art

As shown in FIG. 1, according to a conventional sync separating circuit, a video signal is clamped, the clamped video signal is sliced by a predetermined level, and a sync signal is separated by the amplitude separation (for example, JP-A-6-253170).

That is, in FIG. 1, a video signal is supplied to an input terminal 51. The video signal from the input terminal 51 is supplied to a clamping circuit 52. In the clamping circuit 52, the video signal is clamped so that, for example, a sync chip level of the video signal is made constant. An output of the clamping circuit 52 is supplied to a slice circuit 53. A level that is slightly higher than the sync chip level of the video signal is set as a slice level th into the slice circuit 53. In the slice circuit 53, the level of the video signal is compared with the slice level th.

When the inputted video signal lies within a video period of time, the output level of the clamping circuit 52 is higher than the threshold level th. In a period of time of the sync signal, the output level of the clamping circuit 52 is lower than the threshold level th. Thus, the sync signal can be extracted from the inputted video signal. The sync signal which is outputted from the slice circuit 53 is taken out from an output terminal 54.

In recent years, to realize a small size, a light weight, and low costs of a set, a video signal processing circuit is digitized and arranged on an integrated circuit. A circuit for directly digitizing the video signal and separating a sync signal from the digital video signal is considered.

In case of extracting the sync signal from the analog video signal as mentioned above, the sync chip level of the video signal is clamped and sliced by a slice level that is slightly higher than the sync chip level, so that the sync signal can be separated. However, in the case where the video signal which is not clamped is directly digitized and processed, since the sync chip level fluctuates, it is difficult to accurately extract the sync signal.

Therefore, as shown in FIG. 2A, for example, there is considered a method whereby a minimum value S1 of the video signal is detected and a slice level formed on the basis of the minimum value S1 of the video signal is compared with the video signal, thereby extracting the sync signal. Since the sync chip level of the sync signal is equal to the minimum value of the video signal, if the minimum value of the video signal is detected and the slice level is formed as mentioned above, the slice level can be set to a level that is slightly higher than the sync chip level of the sync signal. Thus, the sync signal can be extracted.

However, as shown in FIG. 2B, particularly, in a reception signal at a place of a weak electric field or a reproduction signal from a tape in which the dubbing was repeated, there is a case where a noise N which drops to a low level is generated in the video signal. If the slice level is formed on the basis of a minimum value S2 of the video signal, the slice level is equal to or less than the sync chip level due to an influence by the noise N which drops lower as mentioned above, so that a problem occurs such that the sync signal cannot be extracted from the video signal.

OBJECTS AND SUMMARY OF THE INVENTION

It is, therefore, an object of the invention to provide a sync signal separating circuit which can certainly extract a sync signal from a digital video signal without being influenced by a noise.

According to the invention, there is provided a sync separating circuit comprising: holding means for holding a level based on a sync chip level; detecting means for comparing the slice level held in the holding means with a minimum value of a present video signal and outputting a detection signal when the minimum value of the present video signal is lower than the level held in the holding means; updating means for updating the level in the holding means on the basis of the minimum value of the present video signal when it is detected by the detecting means that the minimum value of the present video signal is lower than the level held in the holding means; and slice means for setting a slice level on the basis of the level in the holding means, slicing the video signal, and extracting a sync signal, characterized in that the slice level is allowed to gradually approach the sync chip level of the video signal by the updating means.

According to the invention, the updating means updates the level in the holding means by an intermediate value between the level held in the holding means and the minimum value of the present video signal.

According to the invention, mask means for inhibiting the updating of the level in the holding means for a predetermined time after the updating of the level in the holding means was executed for a predetermined period of time is further provided.

According to the invention, level-up means for increasing the level held in the holding means at a predetermined rate is further provided.

The value held as a sync chip level is compared with the minimum value of the present video signal and, when it is detected that the video signal at the present time point is lower than the holding level, it is updated to a new level by the intermediate value between the level held so far and the minimum value of the video signal at that time. By a series of those operations, the holding level gradually approaches the sync chip level of the actual video signal. By setting the slice level on the basis of such a level and by slicing the video signal, the sync signal can be certainly detected.

By inhibiting the updating of the level for a predetermined time after the updating of the holding level was performed for a predetermined period of time, the influence by noises for a video image period of time is eliminated.

By increasing the holding level at a predetermined rate, even if the signal level decreases to the sync chip level or less due to a sag, the holding level gradually approaches the sync chip level.

The above, and other, objects, features and advantage of the present invention will become readily apparent from the following detailed description thereof which is to be read in connection with the accompanying drawings.

BRIEF DESCRIPTION OF THE DRAWINGS

FIGS. 4A to 4E are timing charts for use in explanation of an example of the sync separating circuit to which the invention is applied.

DETAILED DESCRIPTION OF THE PREFERRED EMBODIMENTS

Figure 3:
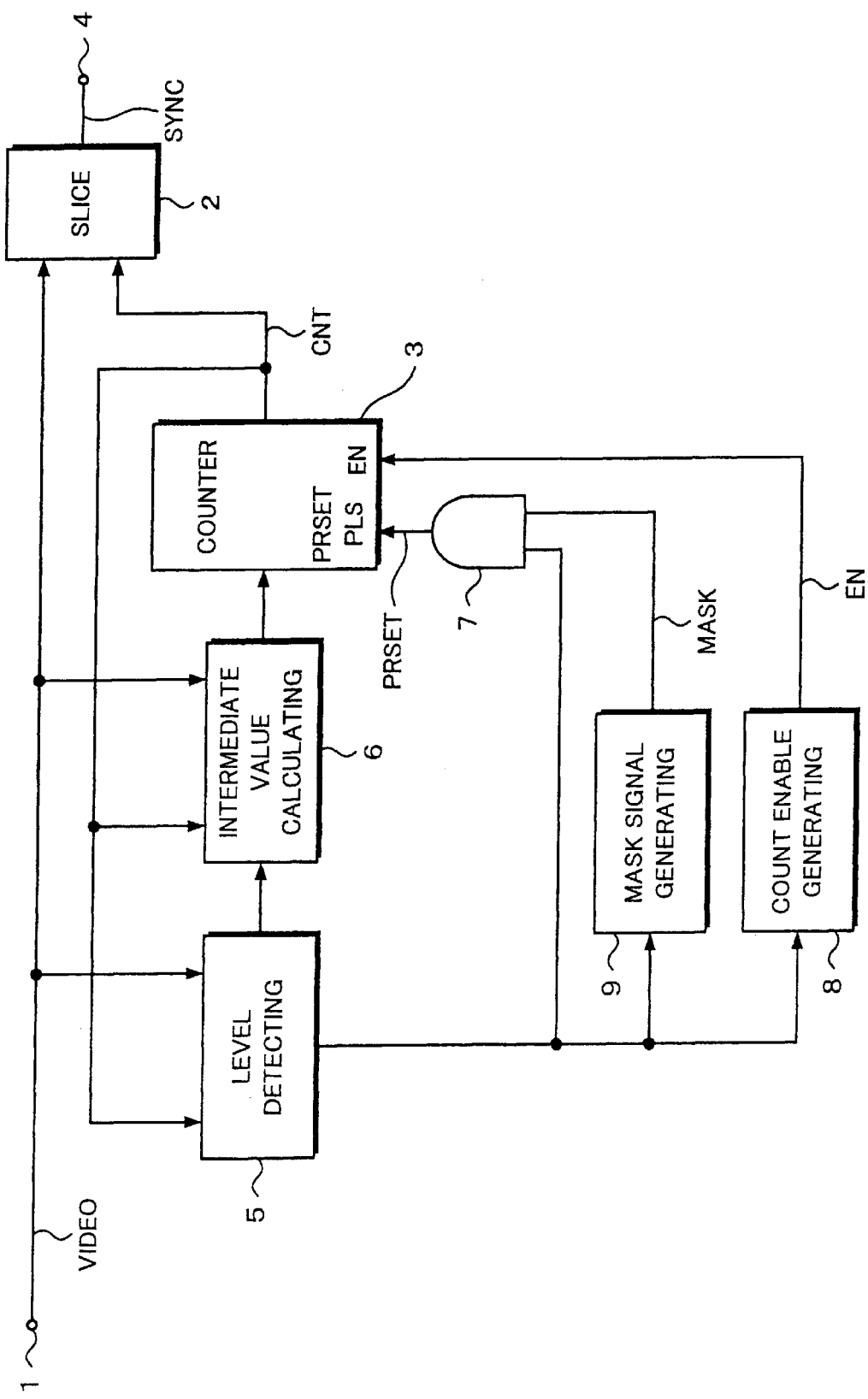
FIG. 3 is a block diagram of an example of a sync separating circuit to which the invention is applied.

An embodiment of the invention will now be described hereinbelow with reference to the drawings. FIG. 3 shows an example of a sync separating circuit to which the invention is applied. In FIG. 3, a digital video signal is supplied to an input terminal 1. The digital video signal from the input terminal 1 is supplied to a slice circuit 2.

The slice circuit 2 is a comparator for comparing a signal level of the input video signal with a slice level that is slightly higher than a sync chip level of the video signal and extracting a sync signal. In this example, an output of an up-counter 3 is used as a slice level to be compared with the input video signal level.

As will be explained hereinlater, a value of the up-counter 3 gradually approaches the sync chip level of the video signal level. By adding an offset to the value of the up-counter 3, the slice level that is slightly higher than the sync chip level is set. In a video interval, the input video signal level is higher than the value of the up-counter 3. When the input video signal level is equal to the sync chip level of the sync signal, the input video signal level is lower than the value of the up-counter 3. Thus, the sync signal is extracted from an output of the slice circuit 2. The sync signal extracted as mentioned above is outputted from an output terminal 4.

To allow the value of the up-counter 3 to gradually approach the sync chip level of the video signal level, a level detecting circuit 5, an intermediate value calculating circuit 6, an AND gate 7, a count enable pulse generating circuit 8, and a mask signal generating circuit 9 are provided.

That is, the digital video signal from the input terminal 1 is supplied to the level detecting circuit 5 and to the intermediate value calculating circuit 6. A value of the up-counter 3 is supplied to the level detecting circuit 5 and intermediate value calculating circuit 6.

The level detecting circuit 5 compares the value of the up-counter 3 with the level of the input video signal and generates a detection signal when the value of the input video signal level is lower. For example, at the sync chip level of the sync signal, the input video signal level is lower than the value of the up-counter 3 and a detection output is derived from the level detecting circuit 5. The output of the level detecting circuit 5 is supplied to the AND gate 7 and is also supplied to the count enable pulse generating circuit 8 and mask signal generating circuit 9.

When it is detected by the level detecting circuit 5 that the video signal level is lower, the mask signal generating circuit 9 generates a mask signal of a low level for a predetermined period of time after the elapse of a predetermined period. The mask signal is provided to mask a noise when the noise which drops to a low level is generated in the video signal. The mask signal is supplied to the AND gate 7.

The intermediate value calculating circuit 6 obtains an intermediate value between the value of the up-counter 3 and the input video signal level. The intermediate value is supplied as a preset value to the up-counter 3.

From the output of the level detecting circuit 5, when the input video signal level is lower than the value of the up-counter 3, a detection signal is outputted. In this instance, when an output of the mask signal generating circuit 9 is at the high level, a preset pulse is generated from the AND gate 7. When the preset pulse is generated from the AND gate 7, the value of the intermediate value calculating circuit 6 is preset into the up-counter 3.

For example, at the sync chip level of the sync signal, the input video signal level is lower than the value of the up-counter 3 and the detection output is obtained from the level detecting circuit 5. For the period of time of the sync signal, since the output of the mask signal generating circuit 9 is at the high level, the preset pulse is generated from the AND gate 7. Thus, the value of the intermediate value calculating circuit 6 is preset into the up-counter 3. The value of the intermediate value calculating circuit 6 in this instance is equal to the intermediate value between the value of the up-counter 3 so far and the sync chip level of the sync signal. Therefore, the value of the up-counter 3 gradually approaches the sync chip level of the sync signal.

From the output of the level detecting circuit 5, when it is detected that the input video signal level of the video signal is lower than the value of the up-counter 3, after the elapse of a predetermined period of time, the mask signal from the mask signal generating circuit 9 is set to the low level for a predetermined period of time. By the mask signal, the noise of the low level which is generated for the video period of time in the next horizontal period of time is masked.

From the output of the level detecting circuit 5 when it is detected that the input video signal level is lower than the value of the up-counter 3, a count enable pulse is generated from the count enable pulse generating circuit 8 after the elapse of a predetermined period of time. When the count enable pulse is supplied to the up-counter 3, the up-counter 3 is counted up. As mentioned above, since the up-counter 3 is counted up, even if a sag or the like occurs, the value of the up-counter 3 traces so as to approach the sync chip level.

FIGS. 4A to 4E show the operation of each section of the sync detecting circuit. It is now assumed that a video signal VIDEO as shown in FIG. 4A is supplied to the input terminal 1 in FIG. 3. The video signal includes a noise N1 which drops to the low level in the video period. The sync signal includes a noise N2 which drops to the low level.

In FIG. 4A, CNT denotes a value of the up-counter 3. As mentioned above, the value CNT of the up-counter 3 gradually approaches the sync chip level of the sync signal of the video signal VIDEO.

At time point $t_0$, since the video signal VIDEO is higher than the value CNT of the up-counter 3, no detection output is outputted from the output of the level detecting circuit 5.

At time point $t_1$ when the sync signal period is started, the video signal VIDEO is lower than the value CNT of the up-counter 3. Therefore, the detection output appears from the level detecting circuit 5. As shown in FIG. 4B, a preset pulse PRSET is generated from the AND gate 7.

By the preset pulse PRSET, the value of the intermediate value calculating circuit 6 is preset into the up-counter 3. Thus, as shown in FIG. 4A, the value of the up-counter 3 decreases and approaches the sync chip level of the video signal VIDEO.

As shown in FIG. 4C, an output of the mask signal generating circuit 9 is set to the low level for a period of time $T_{mask}$ from time point $t_2$ to time point $t_4$. As shown in FIG. 4D, a count enable pulse EN is generated at time point $t_3$. By the count enable pulse, as shown in FIG. 4A, the value CNT of the up-counter 3 is counted up.

Figure 1:
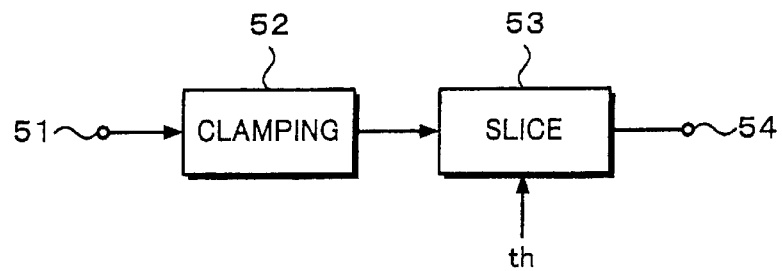
FIG. 1 is a block diagram for use in explanation of an example of a conventional sync separating circuit.
Figure 2A:
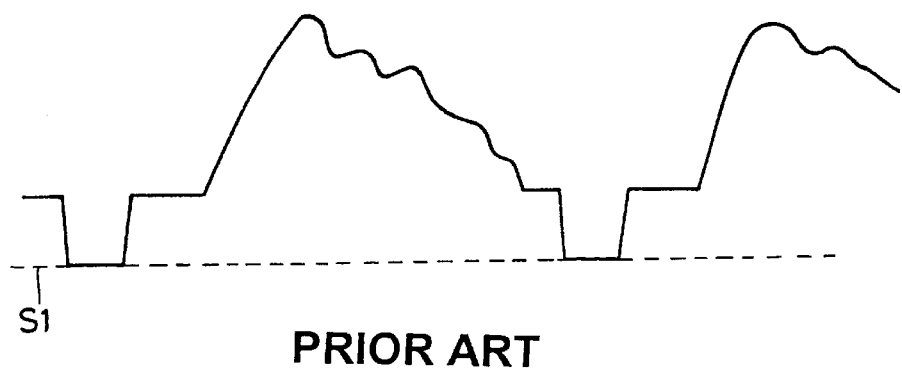
FIGS. 2A and 2B are waveform diagrams for use in explanation of an example of the conventional sync separating circuit.
Figure 2B:
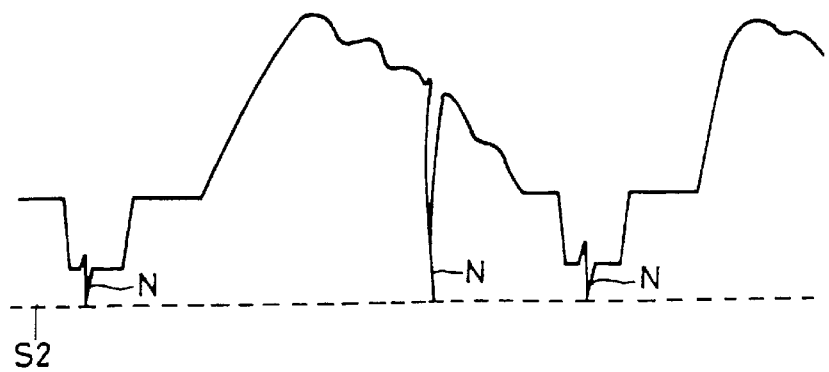

Although the noise N1 which drops to the low level exists in the video period, for the period of time when the noise N1 is generated, as shown in FIG. 2C, the output of the mask signal generating circuit 9 is at the low level. Therefore, the signal is not influenced by the noise N1 as mentioned above.

When the present time approaches the sync signal period and reaches time point $t_4$, as shown in FIG. 4C, the output of the mask signal generating circuit 9 is set to the high level. At time point $t_5$ when the sync signal period is started, the video signal VIDEO is lower than the value CNT of the up-counter 3.

When the video signal VIDEO is lower than the value CNT of the up-counter 3, the detection output appears from the level detecting circuit 5. As shown in FIG. 4B, the preset pulse PRSET is generated from the AND gate 7. By the preset pulse PRSET, the value of the intermediate value calculating circuit 6 is preset into the up-counter 3.

As shown in FIG. 4C, the output of the mask signal generating circuit 9 is set to the low level for the period of time $T_{mask}$ from time point $t_6$ to time point $t_8$. As shown in FIG. 4D, the count enable pulse EN is generated at time point $t_7$. By such a count enable pulse, as shown in FIG. 4A, the value CNT of the up-counter 3 is counted up.

Since the noise N2 was generated at time point $t_5$ in the sync signal period, the value CNT of the up-counter 3 is preset to the intermediate value between the value of the up-counter 3 so far and the level of the noise N2. In this instance, there is a possibility such that the value CNT of the up-counter 3 is equal to or less than the sync chip level. However, since the value CNT of the up-counter 3 is counted up at time point $t_7$, even if the value of the value CNT of the up-counter 3 decreases to the sync chip level or less, it gradually approaches the sync chip level after that.

As mentioned above, the value of the up-counter 3 with the presetting function gradually approaches the sync chip level irrespective of the noise N1 in the video period or the noise N2 in the sync signal period. In the slice circuit 2, the slice level set on the basis of the value of the up-counter 3 which gradually approaches the sync chip level is compared with the input video signal and the sync signal is extracted. Thus, as shown in FIG. 4E, the sync signal SYNC can be accurately extracted without being influenced by the noise.

The sync chip level detected as mentioned above can be used as a reference of the clamping level without being limiting to only the extraction of the sync signal.

According to the invention, the value held as a sync chip level is compared with the minimum value of the present video signal. When it is detected that the video signal level at the present time point is lower than the holding level, it is updated to a new level by the intermediate value between the level held so far and the minimum value of the video signal at that time. By the above series of operations, the holding level is allowed to gradually approach the sync chip level of the video signal. By slicing the video signal by using the slice level set on the basis of the sync chip level, the sync signal can be certainly detected.

By inhibiting the updating of the level for a predetermined time after the holding level was updated for a predetermined period of time, the influence by the noise in the video period of time is eliminated. By increasing the holding level at a predetermined rate, even if the slice level decreases to the sync chip level or less by the sag, the holding level gradually approaches the sync chip level.

According to the invention as mentioned above, since the sync chip level of the actual video signal can be detected, the sync signal can be certainly extracted from the digital video signal without being influenced by the noise. The sync chip level detected as mentioned above can be used as a reference of clamping without being limiting to only the extraction of the sync signal.

Having described a specific preferred embodiment of the present invention with reference to the accompanying drawings, it is to be understood that the invention is not limited to that precise embodiment, and that various changes and modifications may be effected therein by one skilled in the art without departing from the scope or the spirit of the invention as defined in the appended claims.

What is claimed is:

1. A sync separating circuit comprising:

holding means for holding a level based on a sync chip level;

detecting means for comparing the level held in said holding means with a minimum value of a present video signal and outputting a detection signal when the minimum value of said present video signal is lower than the level held in said holding means;

updating means for updating the level in said holding means on the basis of the minimum value of said present video signal when it is detected by said detecting means that the minimum value of said present video signal is lower than the level held in said holding means; and slice means for setting a slice level on the basis of the level in said holding means, slicing said video signal, and extracting a sync signal, characterized in that the level in said holding means is allowed to gradually approach the sync chip level of said video signal by said updating means, wherein said updating means updates the level in said holding means by an intermediate value between the level held in said holding means and the minimum value of said present video signal.

2. A sync separating circuit according to claim 1, further comprising level-up means for increasing the level in said holding means at a predetermined rate.

3. A sync separating circuit comprising:

holding means for holding a level based on a sync chip level;

detecting means for comparing the level held in said holding means with a minimum value of a present video signal and outputting a detection signal when the minimum value of said present video signal is lower than the level held in said holding means;

updating means for updating the level in said holding means on the basis of the minimum value of said present video signal when it is detected by said detecting means that the minimum value of said present video signal is lower than the level held in said holding means; and slice means for setting a slice level on the basis of the level in said holding means, slicing said video signal, and extracting a sync signal, characterized in that the level in said holding means is allowed to gradually approach the sync chip level of said video signal by said updating means, further comprising mask means for inhibiting the updating of the level in said holding means for a predetermined time after the updating of the level in said holding means was executed for a predetermined period of time.

4. A sync separating circuit according to claim 3, further comprising level-up means for increasing the level in said holding means at a predetermined rate.

* * * * *